United States Patent
Bastian et al.

(10) Patent No.: US 10,395,191 B2
(45) Date of Patent: Aug. 27, 2019

(54) RECOMMENDING DECISION MAKERS IN AN ORGANIZATION

(71) Applicant: Microsoft Technology Licensing, LLC

(72) Inventors: Mathieu Bastian, San Francisco, CA (US); Jessica Zuniga, Mountain View, CA (US); Zal Yaz Bilimoria, San Francisco, CA (US); Peter N. Skomoroch, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 977 days.

(21) Appl. No.: 14/501,787

(22) Filed: Sep. 30, 2014

(65) Prior Publication Data

US 2015/0095121 A1  Apr. 2, 2015

Related U.S. Application Data

(60) Provisional application No. 61/884,898, filed on Sep. 30, 2013.

(51) Int. Cl.
*G06Q 10/00* (2012.01)
*G06Q 10/06* (2012.01)
(Continued)

(52) U.S. Cl.
CPC ..... *G06Q 10/063* (2013.01); *G06Q 10/06398* (2013.01); *G06Q 50/01* (2013.01); *G06Q 10/105* (2013.01)

(58) Field of Classification Search
CPC ........... G06Q 10/063; G06Q 10/06; G06Q 10/06398; G06Q 10/105; G06Q 50/01
See application file for complete search history.

(56) References Cited

U.S. PATENT DOCUMENTS

2009/0276233 A1\* 11/2009 Brimhall .............. G06Q 30/02
 705/38
2012/0059767 A1\* 3/2012 Uthmann .............. G06Q 50/01
 705/319

(Continued)

OTHER PUBLICATIONS

Wil M. P. Van Der Aalst, & Song, M. (2004). Mining Social Networks: Uncovering Interaction Patterns in Business Processes. Lecture Notes in Computer Science, 3080, International Conference on Business Process Management, 244-260. (Year: 2004).\*

*Primary Examiner* — William S Brockington, III
(74) *Attorney, Agent, or Firm* — Schwegman Lundberg & Woessner, P.A.

(57) ABSTRACT

This disclosure provides for systems and methods directed to generating colleague recommendations within a social network service. The systems and methods may include identifying a sample member of a social network service and determining an organizational unit associated with the sample member. The sample member may be associated with prior member activity involving a source member and the organizational unit may represent a department within an organization. The systems and methods may also include identifying various candidate members, where the candidate members are associated with the organizational unit. The systems and methods may also include surfacing the plurality of candidate members to a computer system being operated by the source member.

18 Claims, 6 Drawing Sheets

(51) Int. Cl.
*G06Q 50/00* (2012.01)
*G06Q 10/10* (2012.01)

(56) References Cited

U.S. PATENT DOCUMENTS

| | | | |
|---|---|---|---|
| 2013/0091149 A1* | 4/2013 | Dunn | G06F 17/3053 707/749 |
| 2014/0108308 A1* | 4/2014 | Stout | G06N 3/08 706/12 |
| 2014/0164073 A1* | 6/2014 | Mosley | G06Q 10/06398 705/7.42 |
| 2014/0316941 A1* | 10/2014 | Mekala | G06Q 30/0613 705/26.41 |

* cited by examiner

FIG. 6

RECOMMENDING DECISION MAKERS IN AN ORGANIZATION

CROSS-REFERENCE TO RELATED APPLICATIONS

This application claims the benefit of priority to U.S. Pat. App. No. 61/884,898, filed Sep. 30, 2013 and titled "METHODS AND SYSTEMS FOR RECOMMENDING DECISION MAKERS IN AN ORGANIZATION," the disclosure of which is incorporated by reference herein.

TECHNICAL FIELD

The present disclosure generally relates to data processing systems. More specifically, the present disclosure relates to methods, systems, and computer program products for generating recommendations of members of a social network service.

BACKGROUND

A social network service may be a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

DESCRIPTION OF THE DRAWINGS

Some embodiments are illustrated by way of example and not limitation in the FIGs. of the accompanying drawings, in which.

DETAILED DESCRIPTION

The present disclosure describes methods, systems and computer program products that individually or in combination generate colleague recommendations of members of a social network service to other members of the social networking system. In the following description, for purposes of explanation, numerous specific details are set forth in order to provide a thorough understanding of the various aspects of different embodiments of the disclosed systems and methods. It will be evident, however, to one skilled in the art, that the disclosed embodiments may be practiced without all of the specific details.

Consistent with some embodiments, a social network service provides a member (referred herein as a "source member") with a recommendation service that generates recommendations of members of the social network service that may be of interest to the source member. For example, some embodiments may be used to generate colleague recommendations. A "colleague recommendation," as used herein, may refer to a recommendation of a member profile within the social network service that may belong to an organizational unit that is the same or similar to the organizational unit of another member profile of the social network service. As is explained in greater detail below, whether member profiles belong to the same or similar organizations may be based on an organizational similarity score calculated for those members. Further, in some cases, some embodiments may select a member profile as the colleague recommendation based on an estimation of that member profiles importance within the department. In this way, some embodiments may be able to provide source members with a recommendation for a "decision maker" within a department.

To generate a colleague recommendation, example embodiments of the recommendation service may track member activity (e.g., page views, messages, and the like) between a source member and one or more member profiles. A member profile that has been involved with member activity initiated by the source member may be referred to as a "sample member." The recommendation service may then generate a colleague recommendation on the sample member. As an example application, a sales tool may allow a sales person (e.g., the source member) to view a member profile of a potential buyer within a company (e.g., the sample member). The viewed member profile is then selected as the member profile to be the basis for the colleague recommendation.

Based on the sample member associated with the tracked member activities, example embodiments may then determine an organizational unit associated with the sample member. An "organizational unit" may be a term used herein that refers to data or logic representing a department within an organization. In some cases, the organizational unit of an organization is not specified by the organization. Accordingly, some example embodiments may build organizational models of an organization by generating clusters of member profiles based on member connections within the social network service (e.g., connections the sample member has with other members of the social graph that work at the same company), feedback from users of the social networking service, or any other suitable data.

The recommendation service may then identify one or more candidate members based on an organization similarity using the organizational unit associated with the sample member. In some cases, the organization similarity score may be based on a comparison between the organizational unit associated with the sample member and an organizational unit associated with the one or more candidate members. In some embodiments, the recommendation service may calculate the organizational similarity based on a graph factor that may be referred to as "graph similarity." The graph similarity between two member profiles may be a function that is driven by the number of common colleague connections.

In some embodiments, the recommendation service may rank the one or more candidates based on a ranking of the one or more candidates within an organization. For example, in some cases, the recommendation service may rank the one or more candidates based on the seniority or job title of the candidates. In this way, the recommendation service may make a recommendation that includes the decision makers of an organizational unit.

In some cases, the recommendation service may include a feedback system that updates models of an organizational unit for an organization or the business decision score for a candidate member.

It is to be appreciated that colleague recommendations generated by some example embodiments may have many practical advantages. For example, and not limitation, some example embodiments may be used to identify the decision makers for a department within a company, for example. Such a tool may be useful for sales people who may be attempting to sell a product or service to a particular company. To illustrate, a sales person may use a sales solutions product to find and contact employees at a company. In order to close a deal, the sale person may be interested in maximizing the number and the quality of relationships he/she has within the company. Accordingly, some example embodiments described herein may allow a sales person to search a social graph of a social network service to find member profiles matching initial search criteria (e.g., keywords, title, skills, and the like). Upon visiting a member profile identified in the search result, an example embodiment may then use attributes associated with the visited member profile to generate a colleague recommendation that include one or more member profiles that may work with the visited member profiles. In some cases, the colleague recommendation may be presented such that member profiles are ranked according to a prediction of how important that member is within their department. A colleague recommendation generated in this way may provide a suggestion to the sales person as to who should be contacted regarding a purchase decision.

These and other example embodiments are now described in greater detail below.

Figure 1:
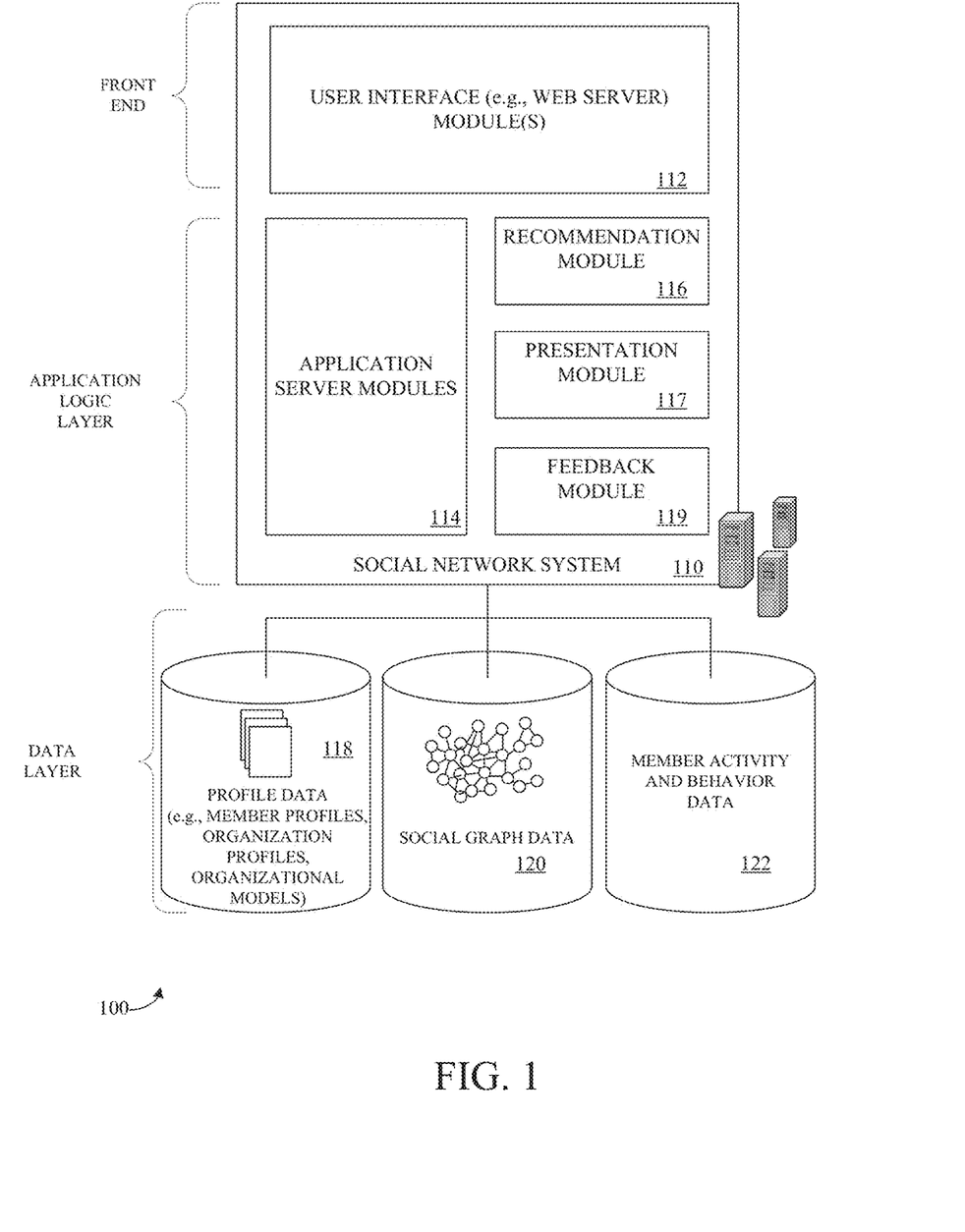
FIG. 1 is a block diagram illustrating various components or functional modules of a social network service, consistent with some embodiments.

FIG. 1 is a block diagram illustrating various components or functional modules of a social network service 100, consistent with some embodiments. As shown in FIG. 1, the front end consists of a user interface module (e.g., a web server) 112, which receives requests from various client-computing devices, and communicates appropriate responses to the requesting client devices. For example, the user interface module(s) 112 may receive requests in the form of Hypertext Transport Protocol (HTTP) requests, or other web-based, application programming interface (API) requests. The application logic layer includes various application server modules 114, which, in conjunction with the user interface module(s) 112, generates various user interfaces (e.g., web pages) with data retrieved from various data sources in the data layer. With some embodiments, individual application server modules 114 are used to implement the functionality associated with various services and features of the social network service. For instance, the ability to generate colleague recommendations for a source member may be service (or services) implemented in independent application server modules 114. Similarly, a variety of other applications or services that are made available to members of the social network service will be embodied in their own application server modules 114. For example, with some embodiments, the social network system 110 includes modules that may individually or in combination provide a colleague recommendation service, such as a recommendation module 116, a presentation module 117, and a feedback module 119. The recommendation module 116 may be a computer-implemented module configured to generate colleague recommendations. Example embodiments may use a variety of information to generate the colleague recommendations, such as attributes obtained from sample members and an organizational model. As described above, a sample member may refer to a member profile that the source member has performed some member activity on. Visiting the profile page of the sample member, messaging the sample member, saving the source member in a contact list, "introducing" the sample member to another member profile, are examples of member activities.

The presentation module 117 may be a computer-implemented module configured to generate user interface elements for interacting with the decision maker recommendations. For instance, the presentation module 117 may generate user interface elements that may execute on a client device. For example, the presentation module 117 may generate user interface elements that, when executed on a client device operated by the source member, display one or more colleague recommendations and user interface control elements for interacting with the displayed colleague recommendations.

As shown in FIG. 1, the data layer includes several databases, such as a database 118 for storing profile data. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 118.

Once registered, a member may invite other members, or be invited by other members, to connect via the social network service. A "connection" may require a bi-lateral agreement by the members, such that both members acknowledge the establishment of the connection. It is to be appreciated that members may "connect" with entities other than member profiles, such as companies, groups, or any other suitable cohort. The various associations and relationships that the members establish with other members, or with other entities represented by date stored in the database 118, are stored and maintained within the social graph, shown in FIG. 1 with reference number 120.

The social network service 100 may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service 100 may host various job listings providing details of job openings with various organizations.

As members interact with the various applications, services and content made available via the social network service, the members' behavior (e.g., content (e.g., profiles) viewed, links selected, messages sent, etc.) may be monitored and information concerning the member's behavior may be stored, for example, as indicated in FIG. 1 by the database with reference number 122. One type of behavior data that may be stored in database 122 is member activity between a member having one member profile with another member having another member profile. As described above, examples of member activities include activities where one member: visits a profile page of a member, messages the member, saves the member in a contact list, introduces the member to another member profile.

Figure 2:
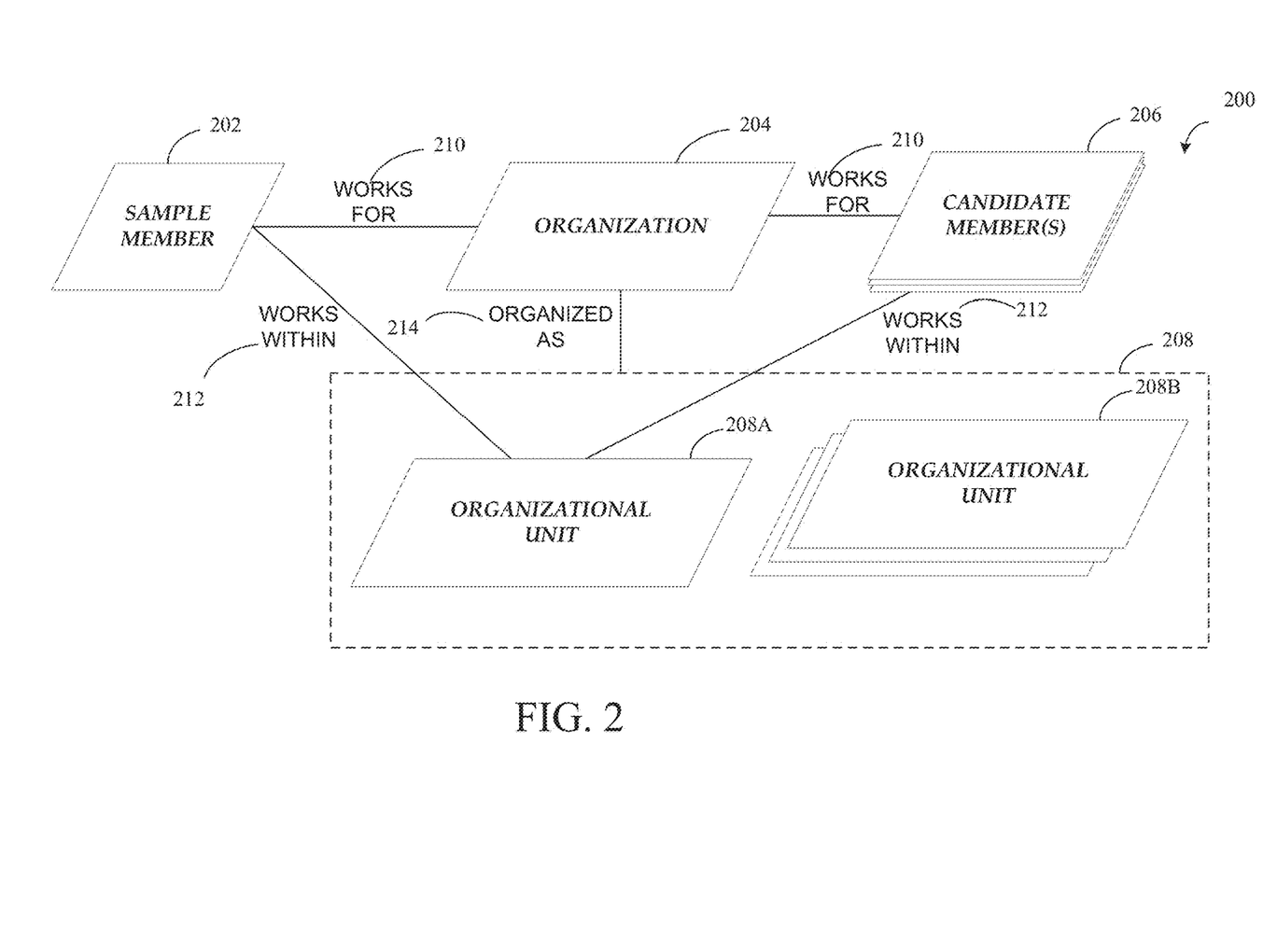
FIG. 2 is a data diagram illustrating an example of a data model, according to an example embodiment.

FIG. 2 is a data diagram illustrating an example of a data model 200, according to an example embodiment. The data model 200 may conceptually describe the data and relationships stored in databases 118, 120, 222. For example, as illustrated in FIG. 2, the data model 200 may include a sample member 202, an organization 204, candidate members 206, and an organizational model 208. The sample member 202 and the candidate members 206 may be member profiles of the social network service 100, as may be stored in the database 118. As described above, the sample member 202 may represent the profile of a member of the social network service that the source member has viewed in the past or has otherwise performed a member activity on. Further, the candidate members 206 may represent the profiles of members of the social network service that may be potentially surfaced to the source member as colleague recommendation.

The organization 204 may be a profile within the social network service that represents a business entity, such as a corporation, partnership, company, or any other suitable business organization. In some cases, the profile of the organization is created by a representative of the business entity that may have been granted authority to perform actions within the social network service on behalf of the business entity.

The organizational model 208 may be a data representation of the organizational structure for the organization 204. For example, the organizational model 208 may characterize the structure of the organization 204 by specifying one or more organizational units 208A-B. An organizational unit may be data or logic representing a department of the real-world organization. It is to be appreciated that compared to teams, organizational units are more generic and usually include multiple teams. For example, an organization may include an organizational unit that contains multiple sub-teams.

In many embodiments, the social network may not have data that specifies the exact name of each organizational unit for each organization. Accordingly, some embodiments may introduce an organizational unit taxonomy the can be used as a standard model for a structure of an organization. These standardized organizational unit taxonomies may be defined for different types of organizations. In some embodiments, the recommendation module 116 may include an inference system to name organization units identified in a social graph of member profiles working at a given organization. Given member position data like function, title or skills the recommendation system 116 may infer the nature of the organization unit name. For instance, it's likely that if most of people at a department have "Sales" as a skill they work in the sales department.

In other cases, the structure of the organizational model 208 may be in whole or in part be defined by feedback from members of the social network. For example, users of the social network service with an understanding of how the business entity represented by the organization 204 is set up may provide feedback on the organizational units of the organization 204.

By way of example and not limitation, Table 1 illustrates an example organizational unit taxonomy.

TABLE 1

| Organizational Unit Name | Description |
| --- | --- |
| Marketing | Department handling activities aiming at making the brand recognizable. |
| Finance/Accounting | Department handling all activities related to managing the organization's finance, such as: accounting, financial reporting, etc. |
| Human Resources | Department handling all activities related to managing human capital. |
| Management | Department handling activities related to widely defined management of the organization. |
| Research Development | Department handling all activities related to finding new solutions, new markets, new ideas and implementing them if regarded valuable for organization. |
| Procurement/Purchasing | Department handling activities related to managing supplies in the enterprise and procurement process management. |
| Administration | Department implementing fiscal and administrative policies in the organization. |
| Inventory | Department which tracks and accounts for capital equipment owned by or loaned to the organization. |
| Customer Service | Department handling all activities related to anticipating customer needs and building good relationship with customer. |
| Logistics | Department handling planning, execution and control of the movement and placement of people and/or goods and of the supporting activities related to such movement and placement. |
| Operations | Department handling activities connected with core of companies business activity. |
| Corporate Communications | Department that acts as first point of contact for the media and general enquiries. Department which shapes the organization's image in media. |
| Sales/Business Development | Department handling activities connected with sales management and processing. |
| International Affairs | Department handling all activities concerning relations with other companies from abroad. |
| Information Technology | Department handling the management of the internal computer systems used to support the business activity of an organization. |
| Engineering | Department handling activities relating to the design, development, testing of new products, systems, or services. |
| Legal | Department handling activities connected with providing legal services and advice to the company, its divisions and employees. |
| Facilities | Department handling activities connected with coordination of space, infrastructure, people and organization. |
| Manufacturing/Quality | Department handling functions of turning inputs into finished outputs through a series of production processes. |

Continuing with FIG. 2, the data model 200 may include relationships between the sample member 202, the organization 204, the candidate members 206, and the organizational model 208. For example, a "Works For" relationship 210 may exist between the organization 204 and the sample member 202 and also the candidate members 206. The "Works For" relationship 210 signifies that a member represented by the member profiles of the sample member 202 or the candidate members 206 is an employee of the organization. In a social network service the "Works For" relationship 210 may be created when a person creates a profile within the social network service and then lists the organization 204 as an employer.

The "Organized As" relationship 214 may be a relationship between an organization and an organizational model that characterizes an organizational structure for the business entity represented by the organization 204. The "Organized As" relationship 214 may be created by a member authorized to edit the profile of the organization (e.g., an administrator) or, additionally or alternatively, by input or feedback from members of the social network.

The "Works Within" relationship 212 may be a relationship between a member profile and an organizational unit of the organizational model 308 that specifies the member works within a department specified by the organizational unit. For example, FIG. 2 shows that the "Works Within" relationship 212 may specify that the sample member 202 works within the organizational unit 208A.

It is to be appreciated that the data model 200 shown in FIG. 2 is provided merely for illustration. Some embodiments may use different data models and still be consistent with this disclosure. For example, some embodiments may represent the organizational model 208 as a property or field within the organization 204, rather than a separate data object connected relationship data.

Figure 3:
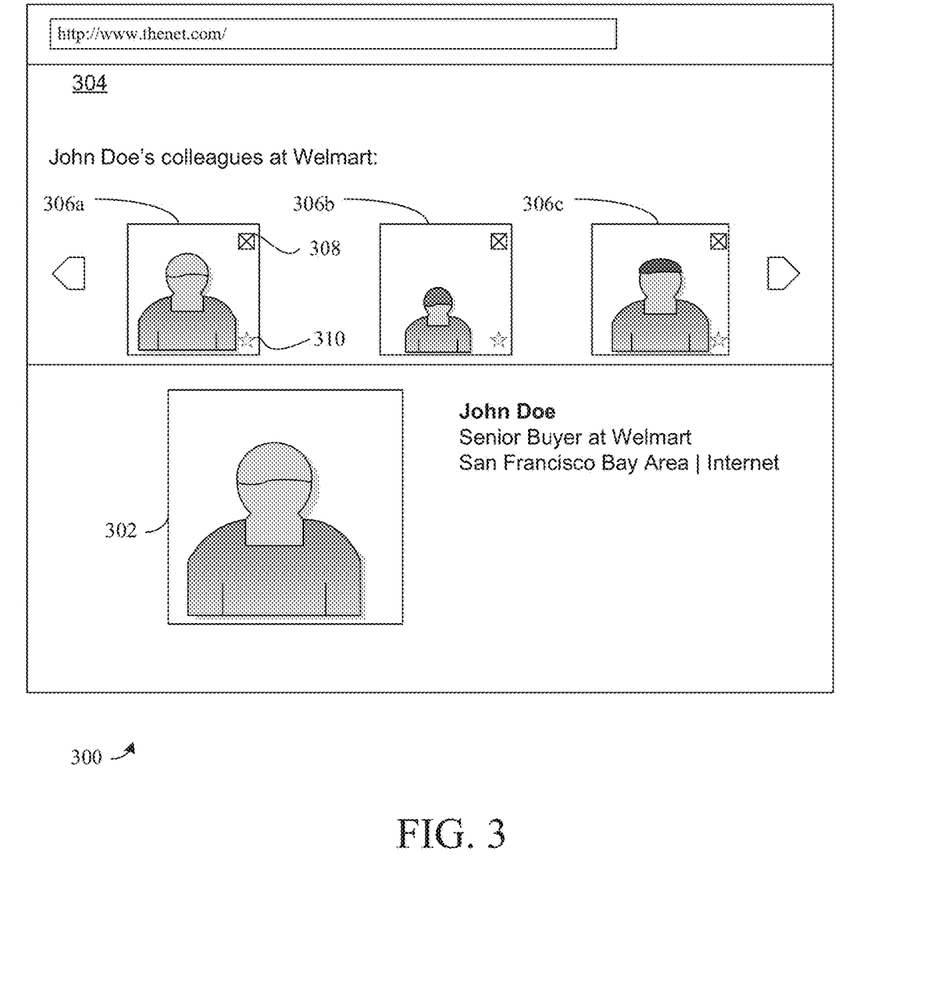
FIG. 3 is a user interface diagram illustrating an example of a user interface or web page for displaying recommendation clusters, consistent with some embodiments.

FIG. 3 is a user interface diagram illustrating an example of a user interface 300 or web page for displaying colleague recommendation to a source member, consistent with some embodiments. In example embodiments, the presentation module 217 may generate data representing the user interface 300 in response to recommendations generated by the recommendation module 316.

As illustrated in FIG. 3, the user interface 300 may include a member profile display 302 that the user interface 300 displays in conjunction with a recommendation module 304. The member profile display 302 may be a computer-implemented user interface element that is configured to display a visual representation of information derived from a sample member. In some cases, the attributes displayed by the member profile display 302 may be data fields of the member profile and, in other cases, the attributes may be based on relationship data that connects the member profile to other profiles (e.g., company profiles, member profiles, group profiles, and the like).

The recommendation module 304 may be a computer-implemented user interface element that is configured to display one or more colleague recommendations to the user. For example, the recommendation module 304 of FIG. 3 displays a visual representation of the colleague recommendations 306A-C. Each colleague recommendation may be a user interface element configured to represent a member profile identified by the recommendation module 116 from the candidate members 206. As is explained in greater detail below, a colleague recommendation may be selected by the recommendation module 116 based at least in part on a similarity between a candidate member and a sample member. As is also explained in greater detail below, a colleague recommendation may be selected by the recommendation module 116 based further on a comparison of organizational units associated with the sample member and the candidate members.

In some cases, a colleague recommendation may include user interface elements for providing feedback data usable to improve the colleague recommendations generated by the recommendation module 116. For example, as shown in FIG. 3, the colleague recommendation 306A includes a negative feedback element 308 and a positive feedback element 310. The negative feedback element 308 may be a user interface element that may be used to specify that the member profile 306A is not of interest to the source member. In some embodiments, the number of times a negative feedback element 308 is initiated by source members for a particular member profile in a colleague recommendation may cause the recommendation module 116 to lower the ranking of that member profile when the recommendation module 116 generates subsequent colleague recommendations. The negative feedback element 308, if activated by the source member, may cause the presentation module 117 to remove the colleague recommendation 306A from the recommendation module 304.

The positive feedback element 310 may be a user interface element that may be used to specify that the member profile 306A is of interest to the source member. In some embodiments, the number of times a positive feedback element is initiated by source members for a particular member profile in a colleague recommendation may cause the recommendation module 116 to increase the ranking of that member profile when the recommendation module 116 generates subsequent colleague recommendations. The positive feedback element 310, if activated by the source member, may cause the presentation module 117 to store the colleague recommendation 306A in a contact data structure associated with the source member.

Thus, the negative feedback element 308 and the positive feedback element 310 may be a mechanism for users of the recommendation service to "down" or "up" vote a particular colleague recommendation.

Figure 4:
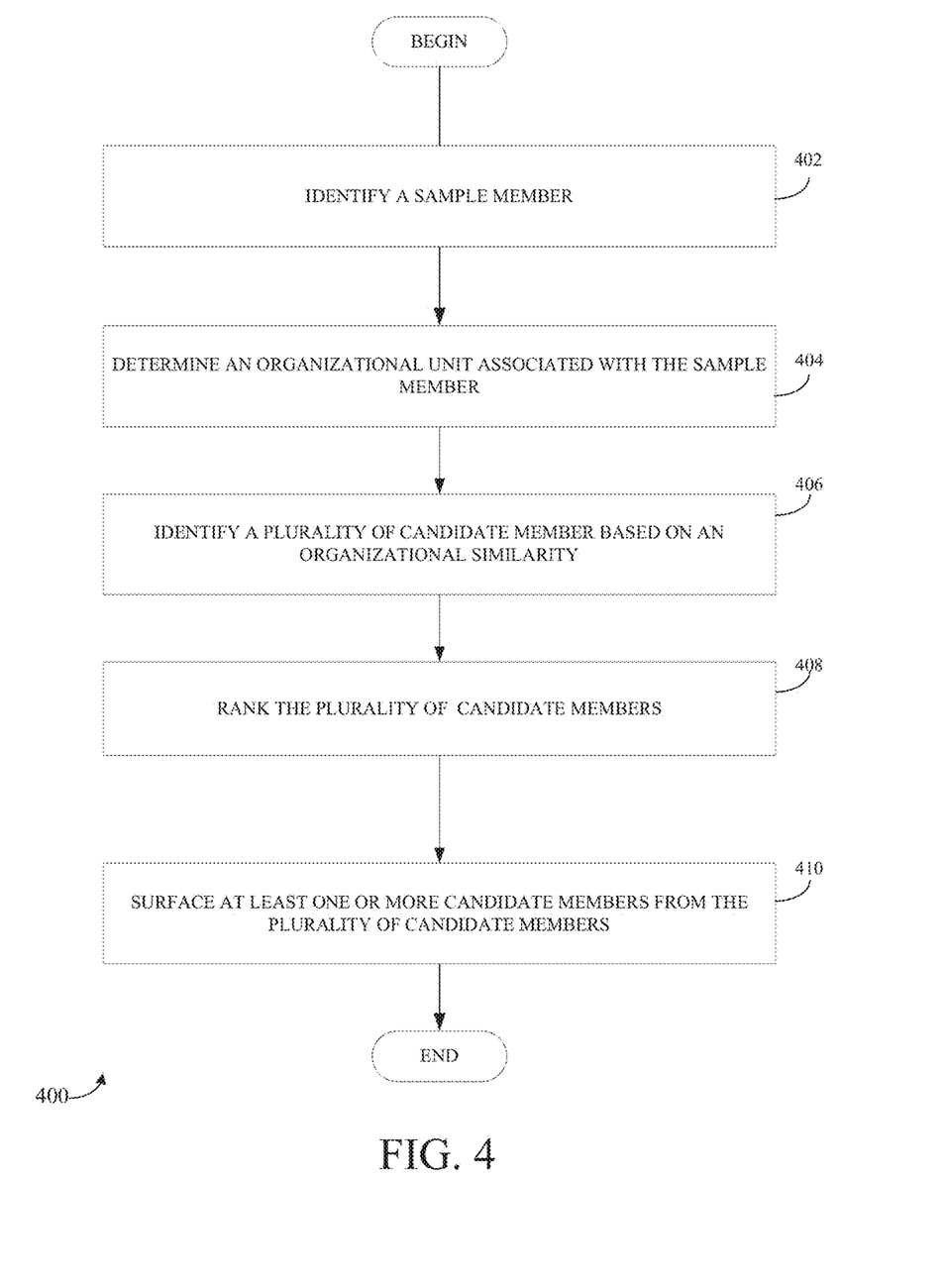
FIG. 4 is a flow diagram illustrating a method of generating recommendation clusters, according to an example embodiment.

FIG. 4 is a flow diagram illustrating a method 400 of generating a colleague recommendation, according to an example embodiment. The method 400 may begin at operation 402 when an application or service (e.g., the recommendation module 116) of the social network system 110 identifies a sample member that can be used to generate a colleague recommendation. In an example embodiment, the sample member may be identified based on member activity involving the source member and the identified sample member. For example, some embodiments may identify member profiles that the source member has sent a message to in the past or has previously visited. As described above, "visiting" may be a term that can refer to an action provided by the social network service where one member (e.g., the source member) can view the profile, or some subset thereof, of another member. As described above, visiting and messaging members are examples of member activity that may be stored in the database 122 of FIG. 1. Other examples of member activity that may be used to identify sample members include search terms used by the member profile to identify relevant members, member profiles saved in a contact list by the source member, member profiles "introduced" to the source member by another member, and any other such member activity.

At operation 404, the recommendation module 116 may determine an organizational unit associated with the sample member. Determining an organizational unit may be based on the connections in the social graph of the social network service. Connections between colleagues form a "company graph", where nodes are employees and edges are connections between employees. The recommendation module 116 may use a clustering algorithm to find sets of nodes that are grouped together. In one example embodiment, the recommendation module 116 may use a clustering algorithm that is based on clustering nodes based on common connections in the company graph.

In some cases, operation 404 may be performed to map the member profiles of an organization to organizational units as part of a batch process that operates in the background. For example, the recommendation module 116 may be used to generate a "Works Within" relationship with an organizational unit of the organization that employs the sample candidate. In some cases, the "Works Within" relationship may be determined based on a function that compares the attributes of the sample member with an attribute profile associated with the organizational unit. As described above, an attribute profile may specify the expected properties of members that work for the organizational unit. In this case, the function that compares the attributes of the sample member may generate a relevancy score that indicates how likely it is that the sample member works for the organizational unit based on a weighted combination of the properties of the sample member and the attribute profile of the organizational unit.

At operation 406, the recommendation module 116 may identify a candidate member based on an organizational unit similarity score between the identified candidate and the identified organizational unit. For example, the recommendation module 116 may identify those member profiles in the social network service that are connected or otherwise related to an organizational unit via, for example, a 'Works Within' relationship that matches or is similar to an organizational unit connected to the sample member via a 'Works Within' relationship. Organizational units may be similar based on a comparison function that generates a similarity score based on similarity of skills associated with members that are tagged to the organizational unit. In one embodiment, the comparison function generates the similarity score using a cosine similarity function and comparing predetermined and/or standardized attributes, such as a skills or jobs function. In this embodiment, the application of the cosine similarity function results in associating candidate members having similar predetermined and/or standardized attributes (e.g., similar skills or job functions) into an organizational unit. To illustrate, where multiple organizational units are associated with members with a particular skill, the recommendation module 116 may increase the similarity score with respect to those organizational units.

At operation 408, the recommendation module 116 may rank the identified candidate member against a plurality of other candidate members. In some embodiments, the recommendation module 116 may rank the identified candidate member against other candidate members identified by operation 406. Accordingly, operation 408 may involve the recommendation module 116 ranking multiple candidate members identified as being part of the same or similar organizational unit of an organization. In some cases, the ranking of the identified candidate members may include generating a candidate score that is based on the seniority of the candidate, the graph of the organization, connections between current employees of the organization, the invitations within the company, and whether these invitations are accepted or not. To illustrate the use of the graph of the organization, ranking the identified candidate members may be based on a graph similarity. As described above, the graph similarity between two member profiles may be defined as a function that is driven by the number of common colleague connections. In one embodiment, the graph similarity is based on the Jaccard Similarity which, when applied to a number of common colleague connections, is equal to:

$$\frac{C_{AB}}{C_A + C_B + C_{AB}}$$

where $C_{AB}$ is the number of common colleagues between a member profile A and a member profile B, $C_A$ is the number of colleagues for member profile A, and $C_B$ is the number of colleagues for member profile B. Profile length, profile views, activity are other factors that may be used to generate the candidate ranking score.

At operation 410, the presentation module 117 may surface the candidate member based on the ranking of the candidate member relative to the other candidate members. For example, one or more of the candidate members in the recommendation module 304 of FIG. 3. Surfacing the candidate member may involve the presentation module 117 generating a visual indication of one or more of the candidate member's name, picture, title, location, or organizational unit.

As discussed above, generating colleague recommendations may be based on criteria that, among other things, consider the similarity of an organizational unit between multiple members of a social network service. However, in some cases, the social network service may lack complete information regarding the organizational units of an organization and, in turn, relationships between members of the social network service and the organizational units of the organizations.

Figure 5:
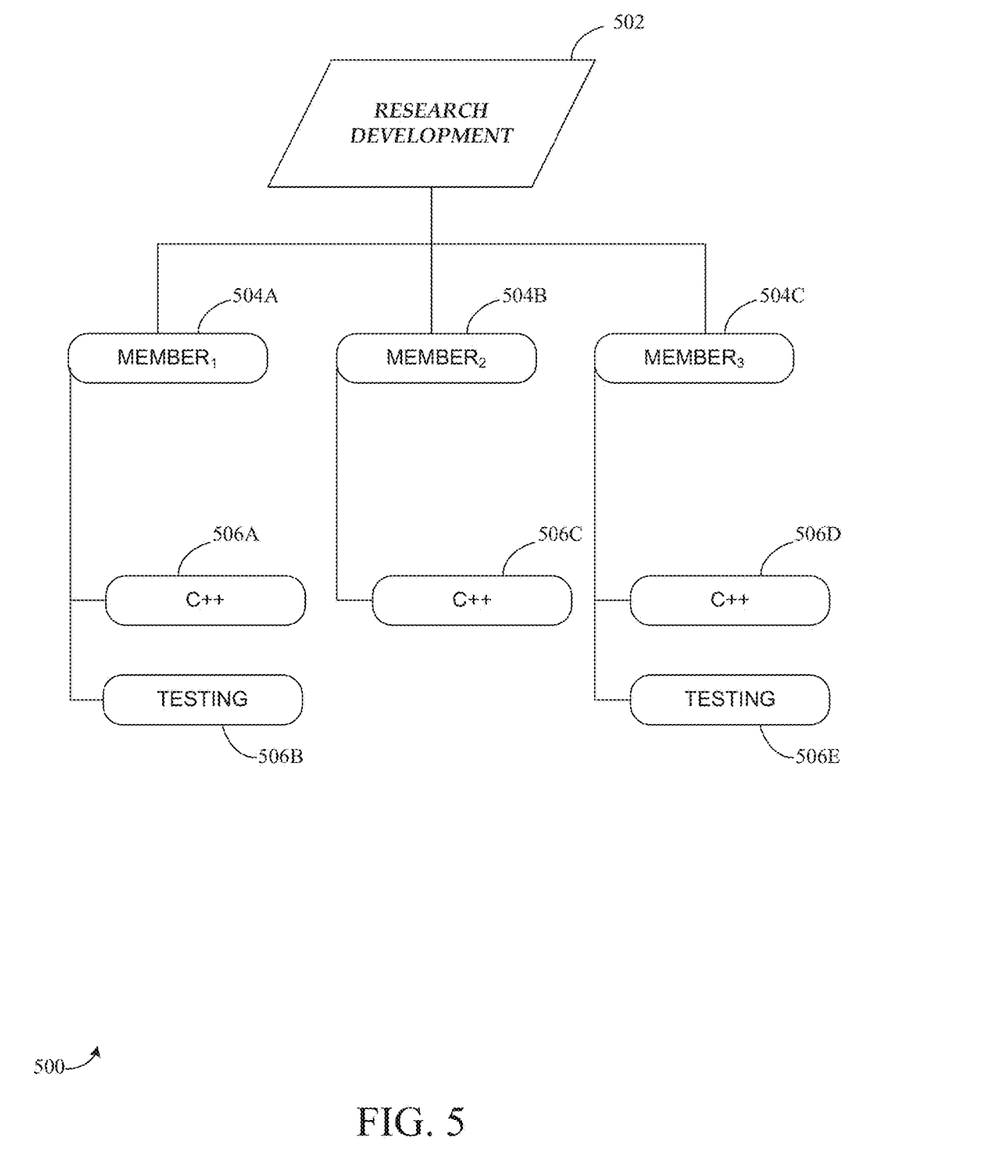
FIG. 5 is a diagram illustrating an example data model of an organizational taxonomy that includes feedback data gathered by, for example, the feedback module of FIG. 1, according to an example embodiment.

In some embodiments, to build organizational unit information, the social network service may define an organizational taxonomy. The feedback module 119 of FIG. 1 may then provide, to source members, a user interface that suggests a 'Works Within' relationship between a candidate member and an organizational unit within the organizational taxonomy. The user interface may provide user interface elements to indicate whether the suggested relationship is correct or not. If the feedback module 119 receives an indication, through the user interface elements, that the suggested relationship is not correct, the feedback module 119 may then suggest other organizational units from the organizational taxonomy, which may, again, be marked as correct or incorrect by the source member. The feedback of whether the suggested relationship is correct or not may be used by the feedback module 119 to learn what skills are associated to distinct organizations units. This may allow the feedback module 119 to get a distribution of skills associated to each organizational unit in the organizational taxonomy. This distribution of skill associated with an organizational unit is referred to as an attribute profile. FIG. 5 is a diagram illustrating an example data model 500 of an organizational taxonomy that includes feedback data gathered by, for example, the feedback module 119, according to an example embodiment. The data model 500 may include one or more organizational units (e.g., organizational unit 502) each associated with skill attributes 506A-E through one or more member profiles 504A-C. The organizational unit 502 may be part of an organizational taxonomy provided or otherwise specified by the social network service or may be specified by users of the social network service. The organizational unit 502, as shown in FIG. 5, may relate to a research development department of an organization. In some cases, the data model 500 may model the skills associated with an organizational unit of particular organization or, in other cases, may model the skills associated with an organizational unit across multiple organizations.

The member profiles 504A-C may represent user profiles of members of the social network service that have been associated with the organizational unit 502. As discussed above, a member profile may be associated with the organizational unit through a 'Works Within" relationship that is specified by the owner of the member profile or through feedback from other members of the social network service.

In turn, the skill attributes 506A-E may be properties used by the social networking system to represent a skill that a member of the social network service has obtained through training, work experience, or the like. A member may cause the social network service to list a skill attribute. As shown in FIG. 5, the member profile 504A may list C++ and Testing (e.g., skill attributes 506A-B) as skills possessed by the member of the member profile 504A. The member profile 504B may list C++ (e.g., skill attribute 506C) as a skill possessed by the member of the member profile 504B. Similar to the member profile 504A, the member profile 504C may list C++ and Testing (e.g., skill attributes 506D-E) as skills possessed by the member of the member profile 504C.

Accordingly, the organizational unit 502 may be associated with the skill attributes of C++ and, to a lesser extent, TESTING through the relationships between the member profiles 504A-C. It is to be appreciated that in some embodiments the feedback module 119 may directly associate the skill attributes 506A-E with the organizational unit 502, rather than through the member profiles 504A-C, as shown in FIG. 5. It is to also be appreciated that in some embodiments, the data model 500 may include weighting values to signify that C++ is more probative to a member belonging to an organizational unit than, for example, the TESTING skill.

Operationally, in some embodiments, the data model 500 may be used by the recommendation module 116 to assign member profiles to organizational units. For example, the feedback module 119 may assign weights to each skill attribute to calculate an organizational probability score that a member profile belongs to a given organizational unit, based on the skill attributes assigned to the member profile. In one embodiment, the organizational probability score is determined through a boosting algorithm, such as AdaBoost or LogitBoost. The organizational probability score may reflect the likelihood that based on properties of the member profile and the data model 500, the member belongs to one of the predefined organizational units. For example, a member who is lists C++ and TESTING as skill attributes may be determined to have a high probability of belonging to a RESEARCH DEVELOPMENT department. This may be implemented in some examples based upon training sets of data in which members are manually classified into the various categories based upon the information the social network service knows about them. These manually classified member profiles may then be used as training data for a classification algorithm. For example, a Bayesian classifier may be used. Additionally or alternatively, the Bayesian classifier may be combined with a boosting algorithm, such as AdaBoost or LogitBoost.

Additionally or alternatively, the feedback module 119 may, in some embodiments, train data relative to an employee score for a member profile. For example, in some cases, the feedback module 119 may cause a client device operated by a member to display a user interface that asks whether a given member profile is a decision maker within an organization. Responsive to receiving responses from multiple users, the feedback module 119 may then utilize the responses in generating an organizational importance score for the member profile. The importance score may be used as a factor in the ranking operation 408 of the method 400 of FIG. 4. The negative feedback element 308 and positive feedback element 310 may be mechanisms to provide feedback on a member profile's importance within an organizational unit.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 6:
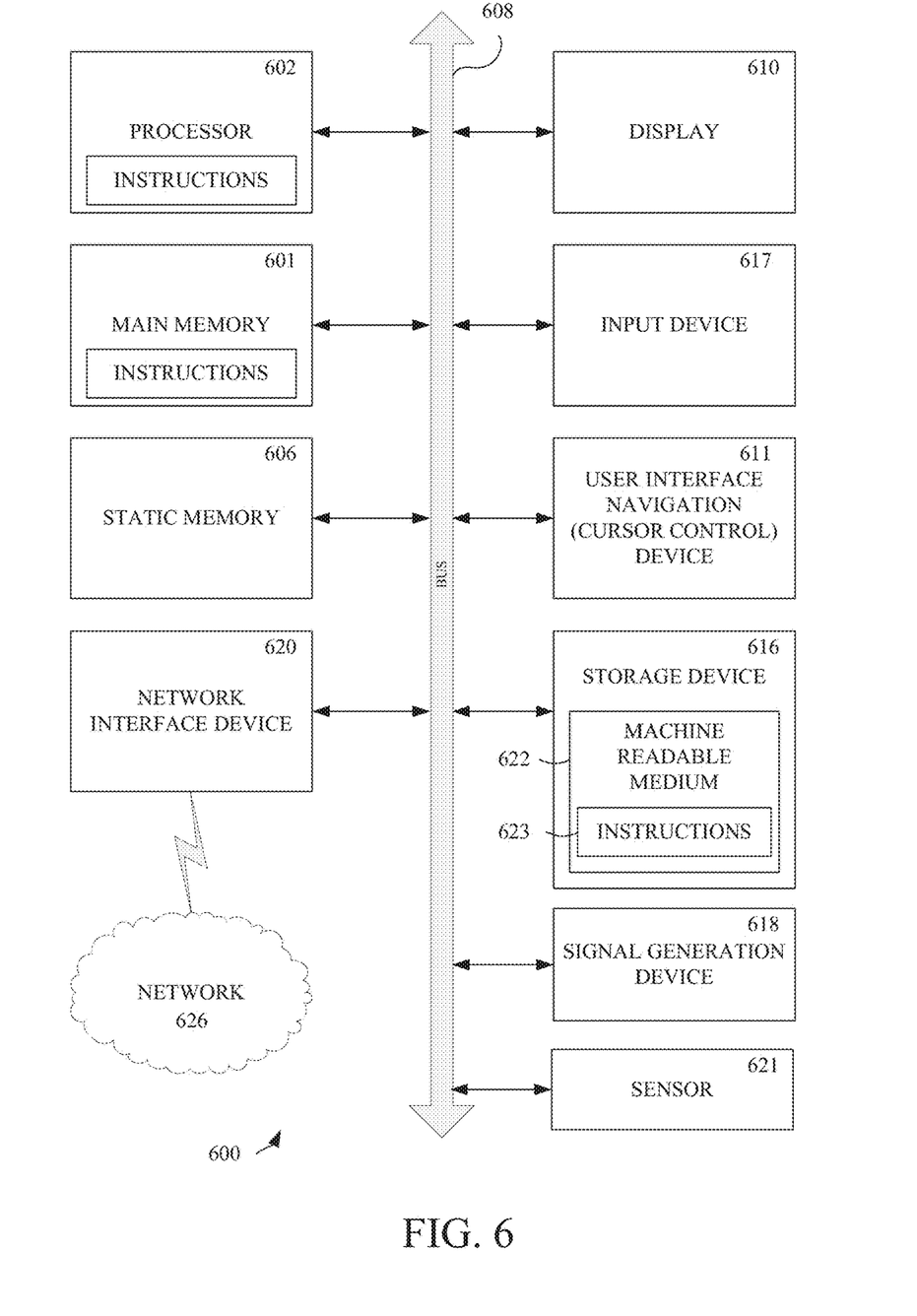
FIG. 6 is a block diagram of a machine in the form of a computing device within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 601 and a static memory 606, which communicate with each other via a bus 608. The computer system 600 may further include a display unit 610, an alphanumeric input device 617 (e.g., a keyboard), and a user interface (UI) navigation device 611 (e.g., a mouse). In one embodiment, the display, input device and cursor control device are a touch screen display. The computer system 600 may additionally include a storage device 616 (e.g., drive unit), a signal generation device 618 (e.g., a speaker), a network interface device 620, and one or more sensors 621, such as a global positioning system sensor, compass, accelerometer, or other sensor.

The drive unit 616 includes a machine-readable medium 622 on which is stored one or more sets of instructions and data structures (e.g., software 623) embodying or utilized by any one or more of the methodologies or functions described herein. The software 623 may also reside, completely or at least partially, within the main memory 601 and/or within the processor 602 during execution thereof by the computer system 600, the main memory 601 and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the disclosed methodologies, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 623 may further be transmitted or received over a communications network 626 using a transmission medium via the network interface device 620 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A computer-implemented method comprising:
    identifying a sample member of a social network service, the sample member being associated with prior member activity involving a source member;
    determining a plurality of organizational units based on a social graph, where nodes of the social graph represent employees and edges between the nodes represent connections between the employees;
    determining, from the plurality of organizational units, a sample organizational unit associated with the sample member by comparing properties associated with the sample member with an attribute profile associated with each organizational unit of the plurality of organizational units, the sample organizational unit representing a department within an organization;
    identifying, by one or more processors, a first plurality of candidate members from the determined plurality of organizational units based on a relationship of a candidate member with an organizational unit selected from the plurality of organizational units;
    for each identified candidate member of the first plurality of candidate members, determining an organizational similarity score based on a comparison between the sample organizational unit associated with the sample member and the organizational unit related to the identified candidate member;
    selecting a second plurality of candidate members from the first plurality of candidate members based on the organizational similarity score;
    determining a candidate score for each candidate member of the second plurality of candidate members;
    ranking each candidate member of the second plurality of candidate members according to the candidate score associated with each candidate member; and
    surfacing the second plurality of candidate members to a computer system being operated by the source member based on the ranking of each candidate member of the second plurality of candidate members.

2. The method of claim 1, wherein the ranking of each candidate member of the second plurality of candidate members occurs prior to the surfacing the second plurality of candidate members to the computer system being operated by the source member.

3. The method of claim 2, wherein at least one candidate score is a function of at least one of: a seniority of a first candidate member, a graph of the organization associated with the first candidate member, connections with other members that are employees of the organization, invitations sent to members of the organization, or an acceptance rate of the invitations.

4. The method of claim 1, wherein determining the sample organizational unit associated with the sample member comprises:
    assigning a first relevancy score to the sample organizational unit, the first relevancy score being a function of an attribute profile associated with the sample organizational unit and the properties of the sample member;
    assigning a second relevancy score to a different organizational unit, the second relevancy score being a function of an attribute profile associated with the different organizational unit and the properties of the sample member; and selecting the sample organizational unit or the different organizational unit based on a comparison of the first relevancy score and the second relevancy score.

5. The method of claim 4, wherein the attribute profile associated with the sample organizational unit is a weighted combination of properties.

6. The method of claim 1, wherein the prior member activity involving the source member is a profile visit.

7. The method of claim 1, wherein surfacing the second plurality of candidate members to the computer system being operated by the source member includes surfacing the second plurality of candidate members to a module of a sales solution tool.

8. The method of claim 1, further comprising:
receiving feedback for one candidate member of the second plurality of candidate members, the feedback indicating that the one candidate member is important; and
updating the ranking of the one candidate member relative to other candidate members.

9. The method of claim 1, further comprising:
receiving feedback for one candidate member of the second plurality of candidate members, the feedback indicating that the one candidate member is unimportant; and
updating the ranking of the one candidate member relative to other candidate members.

10. A computer system comprising:
one or more hardware processors; and
a non-transitory, computer-readable medium having computer-executable instructions stored thereon that, when executed by the one or more hardware processors, configure a first computer system to:
identify a sample member of a social network service, the sample member being associated with prior member activity involving a source member;
determine a plurality of organizational units based on a social graph, where nodes of the social graph represent employees and edges between the nodes represent connections between the employees;
determine, from the plurality of organizational units, a sample organizational unit associated with the sample member by comparing properties associated with the sample member with an attribute profile associated with each organizational unit of the plurality of organizational units, the sample organizational unit representing a department within an organization;
identify, by one or more processors, a first plurality of candidate members from the determined plurality of organizational units based on a relationship of a candidate member with an organizational unit selected from the plurality of organizational units;
for each identified candidate member of the first plurality of candidate members, determine an organizational similarity score based on a comparison between the sample organizational unit associated with the sample member and the organizational unit related to the identified candidate member;
select a second plurality of candidate members from the first plurality of candidate members based on the organizational similarity score;
determine a candidate score for each candidate member of the second plurality of candidate members;

rank each candidate member of the second plurality of candidate members according to the candidate score associated with each candidate member; and
surface the second plurality of candidate members based on the ranking of each candidate member of the second plurality of candidate members to a second computer system being operated by the source member.

11. The computer system of claim 10, wherein the computer system is further configured to rank each candidate member of the second plurality of candidate members prior to surfacing the second plurality of candidate members to the second computer system being operated by the source member.

12. The computer system of claim 11, wherein the candidate score is a function of at least one of: a seniority of a first candidate member, a graph of the organization associated with the first candidate member, connections with other members that are employees of the organization, invitations sent to members of the organization, or an acceptance rate of the invitations.

13. The computer system of claim 10, wherein the computer system is further configured to determine that the sample organizational unit is associated with the sample member based on:
assigning a first relevancy score to the sample organizational unit, the first relevancy score being a function of an attribute profile associated with the sample organizational unit and properties of the sample member;
assigning a second relevancy score to a different organizational unit, the second relevancy score being a function of an attribute profile associated with the different organizational unit and properties of the sample member; and
selecting the sample organizational unit or the different organizational unit based on a comparison of the first relevancy score and the second relevancy score.

14. The computer system of claim 13, wherein the attribute profile associated with the sample organizational unit is a weighted combination of properties.

15. The computer system of claim 10, wherein the prior member activity involving the source member is a profile visit.

16. The computer system of claim 10, wherein the computer system surfaces the second plurality of candidate members by surfacing the second plurality of candidate members to a module of a sales solution tool.

17. A non-transitory computer-readable medium storing executable instructions thereon, which, when executed by a processor, cause the processor to perform operations comprising:
identifying a sample member of a social network service, the sample member being associated with prior member activity involving a source member;
determining a plurality of organizational units based on a social graph, where nodes of the social graph represent employees and edges between the nodes represent connections between the employees;
determining, from the plurality of organizational units, a sample organizational unit associated with the sample member by comparing properties associated with the sample member with an attribute profile associated with each organizational unit of the plurality of organizational units, the sample organizational unit representing a department within an organization;
identifying, by one or more processors, a first plurality of candidate members from the determined plurality of organizational units based on a relationship of a candidate member with an organizational unit selected from the plurality of organizational units;

for each identified candidate member of the first plurality of candidate members, determining an organizational similarity score based on a comparison between the sample organizational unit associated with the sample member and the organizational unit related to the identified candidate member;

selecting a second plurality of candidate members from the first plurality of candidate members based on the organizational similarity score;

determining a candidate score for each candidate member of the second plurality of candidate members;

ranking each candidate member of the second plurality of candidate members according to the candidate score associated with each candidate member; and surfacing the second plurality of candidate members to a computer system being operated by the source member based on the ranking of each candidate member of the second plurality of candidate members.

18. The non-transitory computer-readable medium of claim 17 wherein the ranking each candidate member of the second plurality of candidate members occurs prior to the surfacing of the second plurality of candidate members to the computer system being operated by the source member.

* * * * *

UNITED STATES PATENT AND TRADEMARK OFFICE
CERTIFICATE OF CORRECTION

PATENT NO.      : 10,395,191 B2
APPLICATION NO. : 14/501787
DATED           : August 27, 2019
INVENTOR(S)     : Bastian et al.

It is certified that error appears in the above-identified patent and that said Letters Patent is hereby corrected as shown below:

On the Title Page

Item (71), in "Applicant", in Column 1, Line 1, delete "LLC" and insert --LLC, Redmond, WA (US)-- therefor Signed and Sealed this
Second Day of November, 2021

Drew Hirshfeld
*Performing the Functions and Duties of the*
*Under Secretary of Commerce for Intellectual Property and*
*Director of the United States Patent and Trademark Office*